US010302816B2

(12) United States Patent
Deierling et al.

(10) Patent No.: US 10,302,816 B2
(45) Date of Patent: May 28, 2019

(54) METHOD FOR LIGHTNING FORECASTING AND ALERT SYSTEM

(71) Applicant: University Corporation for Atmospheric Research, Boulder, CO (US)

(72) Inventors: Wiebke Kristina Deierling, Boulder, CO (US); Kyoko Ikeda, Longmont, CO (US); Matthias Steiner, Boulder, CO (US)

(73) Assignee: University Corporation for Atmiospheric Research, Boulder, CO (US)

( * ) Notice: Subject to any disclaimer, the term of this patent is extended or adjusted under 35 U.S.C. 154(b) by 1024 days.

(21) Appl. No.: 14/470,205

(22) Filed: Aug. 27, 2014

(65) Prior Publication Data

US 2015/0073710 A1    Mar. 12, 2015

Related U.S. Application Data

(60) Provisional application No. 61/875,980, filed on Sep. 10, 2013.

(51) Int. Cl.
*G01W 1/02* (2006.01)
*G01W 1/10* (2006.01)
(Continued)

(52) U.S. Cl.
CPC ............... *G01W 1/02* (2013.01); *G01W 1/10* (2013.01); *G01W 1/16* (2013.01); *G08B 21/10* (2013.01)

(58) Field of Classification Search
None
See application file for complete search history.

(56) References Cited

U.S. PATENT DOCUMENTS 5,140,523 A * 8/1992 Frankel ............... G01W 1/10
340/601
6,405,133 B1 * 6/2002 Schwinn ............ G06F 3/0481
702/4

(Continued)

OTHER PUBLICATIONS

Liu et al., (Relationships between lightning flash rates and radar reflectivity vertical structures in thunderstorms over the tropics and subtropics, 2012, Journal of Geophysical Research, 117, pp. 1-19 (Year: 2012).*

(Continued)

*Primary Examiner* — Alexander Satanovsky
*Assistant Examiner* — Lina M Cordero
(74) *Attorney, Agent, or Firm* — The Ollila Law Group LLC

(57) ABSTRACT

A method and system for determining and displaying lightning potential information is provided. The method includes receiving a radar data and temperature data for a grid location. If the radar data is above a radar threshold and the temperature data is below a temperature threshold a predictor field is computed. One or more predictor fields may be used to determine a lightning potential. Fuzzy logic may be used to combine predictor fields into a lightning potential. A grid of lightning potential values may be used to determine the lightning potential at a target location, or to indicate the lightning potential in a region outside an inner outlook region including the target location. A display may include an icon with an inner and outer portion displaying lightning potential in an inner and outer outlook region. A display may further include future lightning potential information.

21 Claims, 8 Drawing Sheets

(51) Int. Cl.
*G01W 1/16* (2006.01)
*G08B 21/10* (2006.01)

(56) References Cited

U.S. PATENT DOCUMENTS

| | | | | |
|---|---|---|---|---|
| 6,405,134 | B1* | 6/2002 | Smith | G01S 13/86 |
| | | | | 702/4 |
| 6,683,609 | B1* | 1/2004 | Baron, Sr. | G01W 1/10 |
| | | | | 345/419 |
| 7,369,053 | B2 | 5/2008 | Rasmussen et al. | |
| 7,868,811 | B1* | 1/2011 | Woodell | G01S 13/86 |
| | | | | 702/4 |
| 9,134,418 | B1* | 9/2015 | Kronfeld | G01S 13/953 |
| 9,244,157 | B1* | 1/2016 | Sishtla | G01S 7/062 |
| 2010/0245165 | A1* | 9/2010 | Kauffman | G01S 13/953 |
| | | | | 342/26 B |
| 2011/0090111 | A1* | 4/2011 | Stagliano, Jr. | G01S 7/025 |
| | | | | 342/26 R |
| 2011/0148694 | A1* | 6/2011 | Bunch | G01S 13/953 |
| | | | | 342/26 B |

OTHER PUBLICATIONS

Zipser, E.J. and K.R. Lutz, 1994: The Vertical Profile of Radar Reflectivity of Convective Cells: A Strong Indicator of Storm Intensity and Lightning Probability?. Mon. Wea. Rev., 122, 1751-1759 (Year: 1994).*

Carey, L.D. and S.A. Rutledge, 2000: The Relationship between Precipitation and Lightning in Tropical Island Convection: A C-Band Polarimetric Radar Study. Mon. Wea. Rev., 128, 2687-2710 (Year: 2000).*

Deierling, W., W. A. Petersen, J. Latham, S. Ellis, and H. J. Christian (2008), The relationship between lightning activity and ice fluxes in thunderstorms, J. Geophys. Res., 113, D15210, doi:10.1029/2007JD009700 (Year: 2008).*

Kodama, Y., H. Okabe, Y. Tomisaka, K. Kotono, Y. Kondo, and H. Kasuya, 2007: Lightning Frequency and Microphysical Properties of Precipitating Clouds over the Western North Pacific during Winter as Derived from TRMM Multisensor Observations. Mon. Wea. Rev., 135, 2226-2241 (Year: 2007).*

* cited by examiner

METHOD FOR LIGHTNING FORECASTING AND ALERT SYSTEM

CROSS-REFERENCE TO RELATED APPLICATION

This application claims priority from U.S. Provisional Patent Application No. 61/875,980, filed Sep. 10, 2013, entitled "Lightning Nowcasting and Alert System," the contents of which are incorporated herein by reference.

GOVERNMENT LICENSE RIGHTS

The U.S. Government has a paid-up license in this invention and the right in limited circumstances to require the patent owner to license others on reasonable terms as provided for by the terms of Agreement No. FAA/DTFAWA-09-X-80005/1/M0963686 awarded by the Federal Aviation Administration and Agreement No. MIPR3EO49VA019, and BASIC/0M0929365 awarded by the Army Test and Evaluation Command.

TECHNICAL FIELD

The present Application relates to weather forecasting, and more particularly, to forecasting lightning.

BACKGROUND OF THE APPLICATION

Safety from lightning is of broad concern to anybody spending time outdoors for work and for recreational reasons. A capability to alert of impending lightning impacts is of particular interest to airports, sites for handling or testing equipment, fuel, ammunition and missiles, outdoor venues (e.g., baseball parks, swimming pools) and special events (e.g., Olympics), construction and open-air mining sites, utilities (e.g., energy, electricity transmission), recreation (e.g., hiking, camping, boating), transportation, and many others more.

Lightning may form over a region as a result of a number of meteorological situations that can produce thunderstorms. For example, lightning may result from an intense thunderstorm that formed some distance away and moves, expands, or grows towards the location of interest. Lightning may also result from a storm that forms right over the location of interest. Such events may result in lightning that comes as a surprise. Other times, lightning may occur in a thunderstorm anvil located tens of kilometers away from the intense convective core of a thunderstorm. In other instances, lightning may form from embedded convection in a winter storm. In other instances, lightning may occur in clouds generated by volcanic eruptions, wildfires, or sandstorms. Present lightning prediction tools do not predict lightning adequately outside the core of a thunderstorm, such as in anvil regions of thunderstorms and during winter thundersnow storms. Present lightning prediction tools furthermore fail to adequately predict lightning onset and cessation.

Larger airports (and other large outdoor operations mentioned above) may employ formal safety procedures that are aided by decision support information, including daily weather briefings and alerts provided when weather begins to impact the general area surrounding an airport. The weather information provided may further include lightning monitoring tools that, in addition to lightning data, may display satellite and radar data in ways that convey the location of dangerous storms and their movement relative to the airport. In the United States, various lightning monitoring tools commonly used at airports employ information from ground based lightning detection systems or electric field measurements. Not uncommonly, such lightning information is prone to lightning event misses and false alarms. None of the lightning monitoring tools and information used at airports provides lightning nowcasting, or near-term predictions of lightning danger. Because the prior decision support information available to airport and airline operators has only included lightning detection information but no lightning forecasting tools, the closures of airport ramps (also known as aprons) due to lightning to date have been reactive instead of proactive.

At airports, safety procedures typically encompass having ramp personnel stop work and come inside if there is lightning occurring within a specified distance of the airport and having personnel resume work after a certain time interval has passed after the last lightning within the specified distance. Similar procedures may be applied for other significant outdoor operations or venues. The critical distance and waiting time period can vary significantly among operators. Uncertainty in lightning information can impact both safety and efficiency in operating an airport. Problems created due to uncertainty in weather information include unnecessary exposure of workers to lightning risk, unnecessary delays for passengers, delays and interruptions in air traffic locally and regionally that could be minimized, and possibly a lack of trust in prediction tools and safety procedures.

Previous attempts to predict lightning have focused on utilizing a variety of observational information, such as: atmospheric sounding data, numerical weather prediction model output, satellite data, and radar data. Radar data has shown the most promise of capturing storm electrification and lightning production for near-term applications, but so far only in thunderstorm cores. None of the prior lightning prediction methods has been effective at predicting the onset and cessation of lightning, lightning in anvil regions, or thundersnow events, however.

Under prior methods, when a decision is made to close an airport due to detection of lightning within a designated distance of an airport, an alert has been sent to personnel signaling to halt ramp operations. Work is typically resumed only after a designated wait time passes after the last lightning strike has been detected within that designated distance of the airport.

In view of the foregoing, it may be deemed desirable to provide a tool that can offer a more complete and accurate prediction of lightning that incorporates current and near future weather information, and is easy to understand, calibrate, and tailor for different safety applications.

SUMMARY OF THE APPLICATION

A method for determining lightning potential is provided. The method includes the step of receiving a radar data for the first grid location, and receiving a temperature data for a first grid location. If the radar data is above a first radar threshold and the temperature data is below a first temperature threshold, the method includes the step of computing a first predictor field. If the radar data is above a second radar threshold and the temperature data is below a second temperature threshold, the method includes the step of computing a second predictor field. The method includes the step of determining the first lightning potential using at least the first predictor field and the second predictor field, wherein at least one of the first predictor field and the second predictor field are selected from a plurality of predictor fields, the plurality of predictor fields including: a cloud depth, a maximum reflectivity, a vertically integrated ice mass, and a product of volume-average radar echo intensity and average cloud depth.

A system for determining lightning potential is provided. The system includes a weather data module configured to receive a radar data for a first grid location and a temperature data for the first grid location. The system further includes a predictor field module configured to compute a first predictor field if the radar data is above a first radar threshold and the temperature data is below a first temperature threshold, and to compute a second predictor field if the radar data is above a second radar threshold and the temperature data is below a second temperature threshold, wherein at least one of the first predictor field and the second predictor field are selected from a plurality of predictor fields, the plurality of predictor fields including: a cloud depth, a maximum reflectivity, a vertical integrated ice, and a product of volume-average radar echo intensity and average cloud depth. The system further includes a lightning potential module configured to determine the first lightning potential using at least the first predictor field and the second predictor field.

A method for displaying lightning potential is provided. The method includes the step of receiving an inner lightning potential corresponding to an inner outlook region including a target location. The method further includes the step of receiving an outer lightning potential corresponding to an outer outlook region peripheral to the inner outlook region. The method further includes the step of displaying the inner lightning potential in an inner portion of an icon on a display, wherein the inner portion includes a first color indicating whether the inner lightning potential is low, medium, or high. The method further includes the step of displaying the outer lightning potential in an outer portion of the icon, the outer portion of the icon peripheral to the inner portion of the icon, and the outer portion including a second color indicating whether the second lightning potential is low, medium, or high.

DETAILED DESCRIPTION OF THE APPLICATION

FIGS. 1-11 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
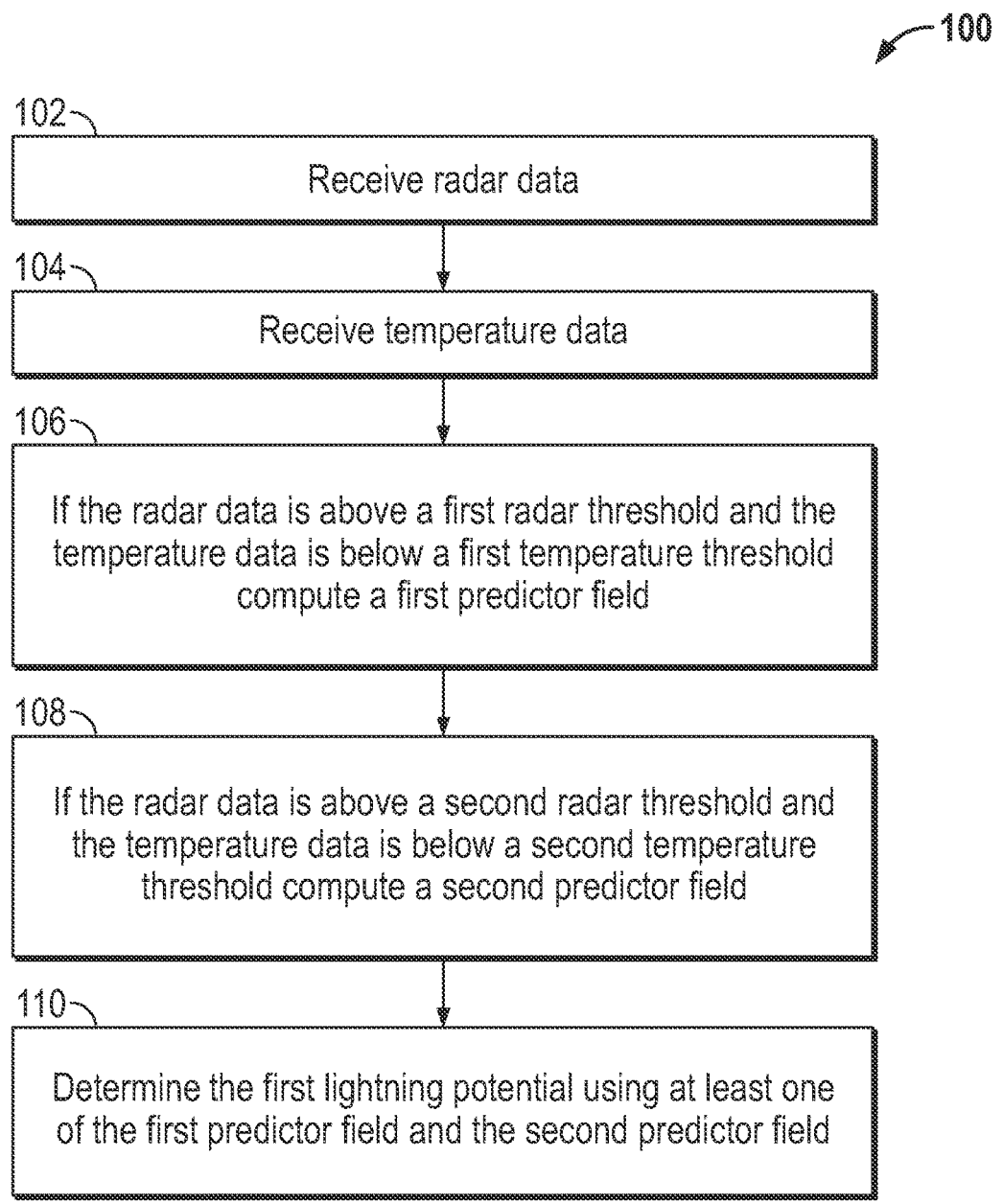
FIG. 1 depicts a method 100 for determining lightning potential according to an embodiment of the Application.

FIG. 1 depicts a method 100 for determining lightning potential according to an embodiment of the Application. Method 100 begins with step 102. In step 102, radar data is received for a first grid location. Radar data may include data received from any type of weather radar instrument commonly known to those of skill in the art. For example, data may include Doppler and polarimetric weather radar data. The radar data correlates to a region or volume of the atmosphere at the first grid location.

Figure 3:
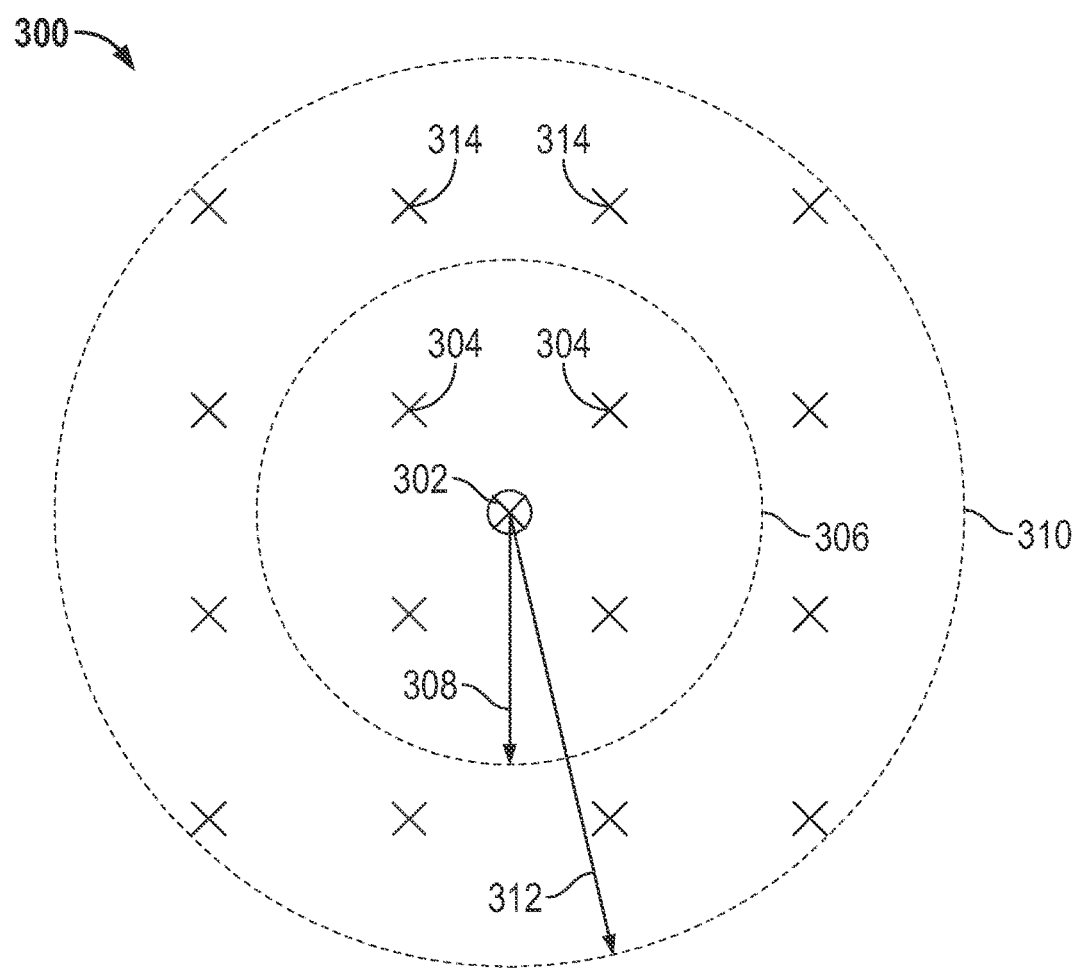
FIG. 3 depicts a lightning prediction zone 300 according to an embodiment of the Application.

For example, FIG. 3 depicts lightning prediction zone 300. Lightning prediction zone 300 is a two-dimensional diagram corresponding to a geographical area on the Earth's surface. This is not intended to be limiting, however, as lightning prediction zone 300 may further include an altitude dimension. As may be seen in FIG. 3, lightning prediction zone 300 includes target location 302. A target location 302 is a geographical location for which a lightning potential prediction is desired.

As may be further seen in FIG. 3, lightning prediction zone 300 further includes grid locations denoted by "X" characters 304. A grid location is a geographical position in any 2 or 3-dimensional coordinate system commonly known to those of skill in the art. For example, radar data may correlate to a grid location having a latitude, longitude and altitude position.

Method 100 continues with step 104. In step 104, temperature data is received. The temperature may be important for determining lightning potential because thunderstorm electrification is associated with glaciated regions within clouds, for example regions of clouds that have below freezing temperatures. In particular, the three-dimensional structure of temperature may be important. Temperature data may include data received from any type of weather instrument commonly known to those of skill in the art. For example, temperature data may be received from a ground weather station, or a sounding. In embodiments, temperature data may also be received from a numerical weather prediction model or analyses based on combining different sources of temperature information. The temperature data may correspond to the same grid location as the radar data.

It has been observed that mixed-phase and cold regions within a storm produce lightning. In particular, observational evidence suggests that a strong updraft in the mixed phase region, with temperatures typically between 0° C. to −40° C., create the necessary conditions that produce lightning. Cold, mixed phase regions are where the non-inductive charging process is believed to generate most of the storm electrification, which comprises rebounding collisions between graupel and ice crystals in the presence of supercooled liquid water. Other processes within clouds may generate electric fields as well and potentially produce lightning.

In embodiments, polarimetric radar data may be utilized instead of or in addition to radar and temperature data. Polarimetric radar data may identify precipitation ice in thunderstorms more accurately. Some initial results have shown that using the graupel signature identified from the Next-Generation Radar (NEXRAD) polarimetric radar data may reduce the lag time of lightning potential forecasts compared to using a 35 dBZ radar threshold at −10° C. Additionally, other polarimetric radar signatures have been linked to strong electric fields via detecting the vertical alignment of ice crystals. In other embodiments, synthesis of data collected by more than one Doppler radar may yield three-dimensional wind fields that include vertical velocity information relevant for storm electrification. These polarimetric and Doppler radar signatures may be utilized to better define a radar-based lightning potential forecast and may add value in forecasting lightning onset and cessation.

Method 100 continues with step 106. In step 106, a first predictor field is computed if the radar data is over a first radar threshold and the temperature data is under a first temperature threshold. Radar and temperature data thresholds may help identify regions of the atmosphere where specific atmospheric processes are at work relating to a particular predictor field. For example, radar and temperature data thresholds may help identify dynamic updraft and microphysical high-density ice conditions indicating storm electrification.

In embodiments, step 106 may determine whether temperature data is within a temperature range instead of below a temperature threshold. Similarly, step 106 may determine whether radar data is within a radar data range instead of above a radar threshold. For example, step 106 may focus on a temperature range from 0 to −10° C. or a radar data range from 10 to 20 dBZ. In embodiments, a temperature or radar threshold may further vary by climatological region and type of thunderstorm.

If it is determined in step 106 that the radar data is over a first radar threshold and that the temperature data is under a first temperature threshold, a first predictor field is calculated. In embodiments, a predictor field may be a cloud depth, a maximum radar reflectivity, a vertical integrated ice and a product of volume-averaged radar reflectivity and average cloud thickness within a specified volume. This is in no way intended to be limiting, however, as it will be understood by those skilled in the art that additional predictor fields are possible that capture updraft strength (e.g., based on multiple-Doppler analyses) and ice microphysics (e.g., based on utilizing multi-polarization radar information).

In embodiments, the predictor field may include a cloud depth. Cloud depth is the distance between two relevant temperature levels. In particular, cloud depth is the vertical distance between the altitude given by the temperature threshold and the altitude given by the radar intensity threshold.

In embodiments, the predictor field may include a maximum reflectivity. The maximum reflectivity is the highest value of storm intensity within the cloud depth range.

In embodiments, the predictor field may include a vertically integrated ice mass. The vertically integrated ice mass is determined based on a summation of the radar-derived ice mass at each grid point in a vertical direction that exhibits radar echoes exceeding a threshold, starting at a level determined by the temperature threshold. In embodiments, the radar and temperature thresholds used to select the vertically integrated ice predictor field may be similar to those applied for cloud depth calculation.

In embodiments, the predictor field may include the product of volume-averaged radar reflectivity and average cloud thickness. The product is derived over a specifiable volume surrounding a grid point, typically a diameter of several kilometers.

Method 100 continues with step 108. In step 108, a second predictor field is computed if the radar data is over a second radar threshold and the temperature data is under a second temperature threshold. Step 108 is similar to step 106, except that step 108 may include different radar and temperature thresholds to initiate the computation of an additional predictor field.

In embodiments, additional steps may be included with steps 106, 108, to determine a third predictor field. For example, a third radar threshold and a third temperature threshold may be used to identify a third predictor field. In further embodiments, further additional radar and temperature thresholds may be used to identify further additional predictor fields.

Method 100 continues with step 110. In step 110, a first lightning potential is determined using at least the first predictor field and the second predictor field. In embodiments, additional predictor fields, such as the third predictor field described above, may be used to determine the lightning potential for a target location.

For example, step 110 may include determining the lightning potential for a target location by applying fuzzy logic to the first predictor field and the second predictor field. Fuzzy logic may include generating an interest value for each respective predictor field. An interest value may be generated by rescaling a predictor field to a value between 0 and 1 using a membership function. A weight may then be applied to the interest value corresponding to a predictor field. Weighted interest values may then be combined to produce a single lightning potential value for a location, such as a grid point.

In embodiments, a membership function may be predetermined for a predictor field based on comparisons between the predictor field values and observed three-dimensional lightning information. In embodiments, a membership function may be dependent upon a single predictor field or multiple predictor fields. The membership function may be a simple linear function or a step function, or any other appropriate function to capture the relevant dependency.

A membership function may then be applied to a predictor field to generate an interest value for the predictor field. The interest value for each respective predictor field, a value between 0 and 1, may then be multiplied by a respective weight. Each weight may be predetermined by carefully evaluating test predictor field output. The weighted interest values may then be summed or averaged across all applicable predictor fields to determine a lightning potential value for a respective location, such as the grid points described relating to FIG. 3 above.

In embodiments, step 110 may further include determining the lightning potential for a target location based upon the determination of a plurality of first lightning potentials for a first plurality of grid locations within an inner outlook region that includes the target location and the grid location. For example, returning to FIG. 3, the lightning prediction zone 300 depicts target location 302, grid locations 304, and inner outlook region 306. Target location 302 is the location where lightning potential information is desired. For example, target location 302 may be an airport or another outdoor venue of interest. The lightning potential at grid locations 304 may be used to determine the lightning potential at target location 302. For example, grid locations 304 may each be located 500 meters from an airport. While FIG. 3 depicts only four grid locations 304, those skilled in the art will understand that any number of grid locations in any combination of positions may be used inside inner outlook region 306 to predict the lightning potential at target location 302.

In the example of lightning prediction zone 300, inner outlook region 306 is a circle with a radius 308 centered on target location 302. This is not intended to be limiting, however. Those skilled in the art will recognize that other shapes and orientations are possible for inner outlook region 306 as well.

In embodiments additional steps may be performed in addition to those described for method 100. For example, in an embodiment a second lightning potential may be determined for an outer outlook region. Returning to FIG. 3, lightning prediction zone 300 includes an outer outlook region 310. Outer outlook region 310 is formed as a ring that surrounds, or is peripheral and adjacent to inner outlook region 306. Like inner outlook region 306, outer outlook region 310 is also centered on target location 302. Outer outlook region 310 occupies the space between the circles traced out by radius 308 and radius 312. Example grid locations 314, denoted by "X"s, are depicted inside outer outlook region 310.

In embodiments, the second lightning potential may be determined for outer outlook region 310 based upon a plurality of grid locations 314 located within the outer outlook region 310. Advantageously, the second lightning potential may be used to help assess the present or near future lightning potential at the target location, as will be further discussed below.

While outer outlook region 310 may be represented as a geographical annulus in lightning prediction zone 300, those skilled in the art will recognize that outer outlook region 310 may take other forms that are peripheral to inner outlook region 306. In further embodiments, the outer outlook region 310 may be divided into a plurality of segments that cover azimuthal sections of the annulus shown in FIG. 3 to assess the direction from which a lightning threat is approaching.

Predicting a lightning potential for target location 302 based on inner outlook region 306 may allow an operator to determine what actions need to be taken to ensure safe operations at target location 302 in the near term. In embodiments, radius 308 may be chosen to optimize the ability of a human operator to anticipate the potential for lightning based on the circumstances surrounding the target location. For example, the length of radius 308 may be selected to provide enough lead time to perform safety procedures. The length of radius 308 may be selected based on uncertainty in lightning potential conditions around a target or risk tolerance in the near term. For example, radius 308 may be 2 to 10 miles away from a target airport location.

Determining a lightning potential for outer outlook region 310 may allow an operator to anticipate what actions should be taken in the near future term to ensure safe operations at target location 302. In embodiments, radius 312 may be chosen to optimize lightning potential prediction accuracy. For example, the length of radius 312 may be selected based on an uncertainty in lightning potential conditions around a target or a stakeholder risk tolerance in the near future term.

From an operator perspective, inner and outer outlook regions 306 and 310 may each serve important purposes in determining not only what the lightning hazard is in the present or near term, but also how the lightning hazard is likely to change in the near future term. In other words, the length of radii 308 and 312 may be used to capture the immediate and expected near-future lightning impact risks on operations.

In further embodiments of method 100, at least one future lightning potential may be determined for at least one future time period. For example, a future lightning potential may be determined for a future time period that is five or ten minutes in the future. In further embodiments, a future lightning potential may be determined for each of a series of time periods stepped into the future. For example, a future lightning potential may be determined for time periods that are 5, 10, 15, and 20 minutes into the future. The future lightning potential(s) determined may be for a target location 302, a grid location 304, 314, an inner outlook region 306, or an outer outlook region 310.

In embodiments, the future lightning potential may be determined, predicted, or extrapolated into the very near future to account for observed weather trends using any extrapolation technique commonly known to those of skill in the art. In an example, a future lightning potential may be determined by either extrapolating a present lightning potential or by extrapolating one or more predictor fields. In a further example, the future lightning potential may further be determined by tracking the structural evolution of a 3-dimensional radar storm before determining predictor fields and lightning potential. For instance, advecting current lightning potential predictor fields may be extrapolated into the future to determine a future lightning potential. Simple extrapolation techniques may be used, or advanced techniques based on image-morphing or multi-scale motion may be used to determine future lightning potential, as will be understood by those skilled in the art.

In further embodiments of method 100, the frequency with which a present lightning potential or a future lightning potential is updated maybe be selectable. In embodiments, the update frequency may be selectable on a scale of minutes.

In further embodiments of method 100, it may be possible to determine the potential for cloud-to-cloud or cloud-to-ground lightning.

Advantageously, predicting lightning potential enables the identification of areas where lightning is typically frequent, such as the areas inside of storm cores. Predicting lightning potential also enables the identification of areas where lightning is typically less frequent, however, such as the areas within anvil clouds. In an example embodiment, the lightning potential output may be scaled between 0 and 1.6, or between any other numbers that may be convenient.

Figure 7:
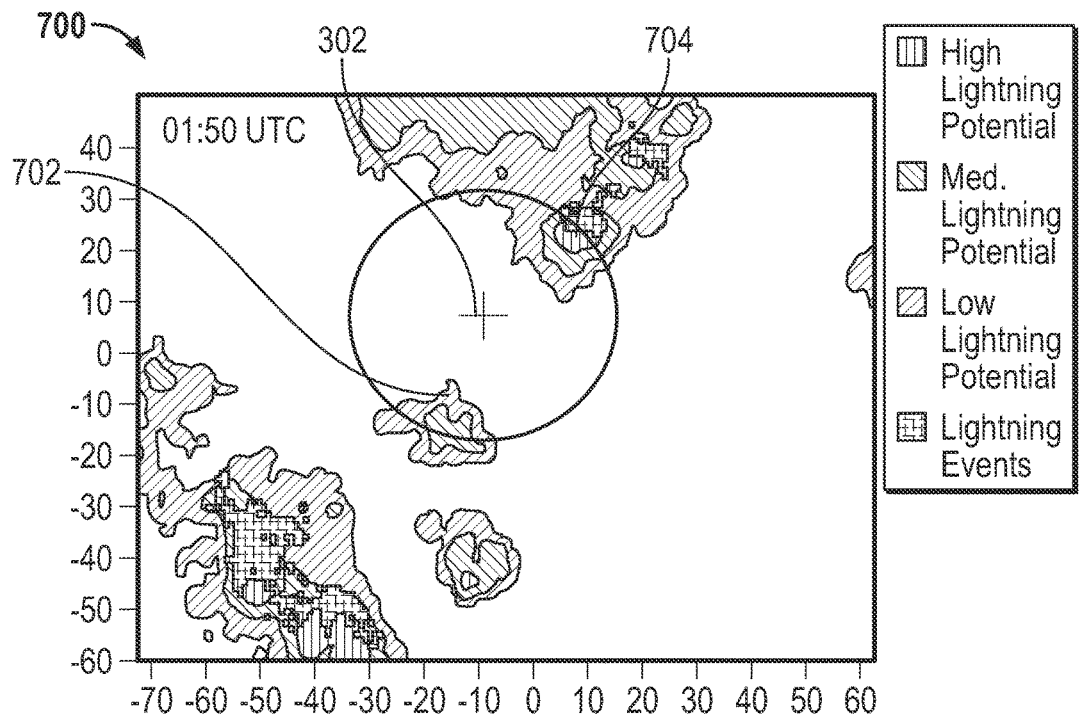
FIG. 7 depicts an example of a storm event 700 according to an embodiment of the Application.
Figure 8:
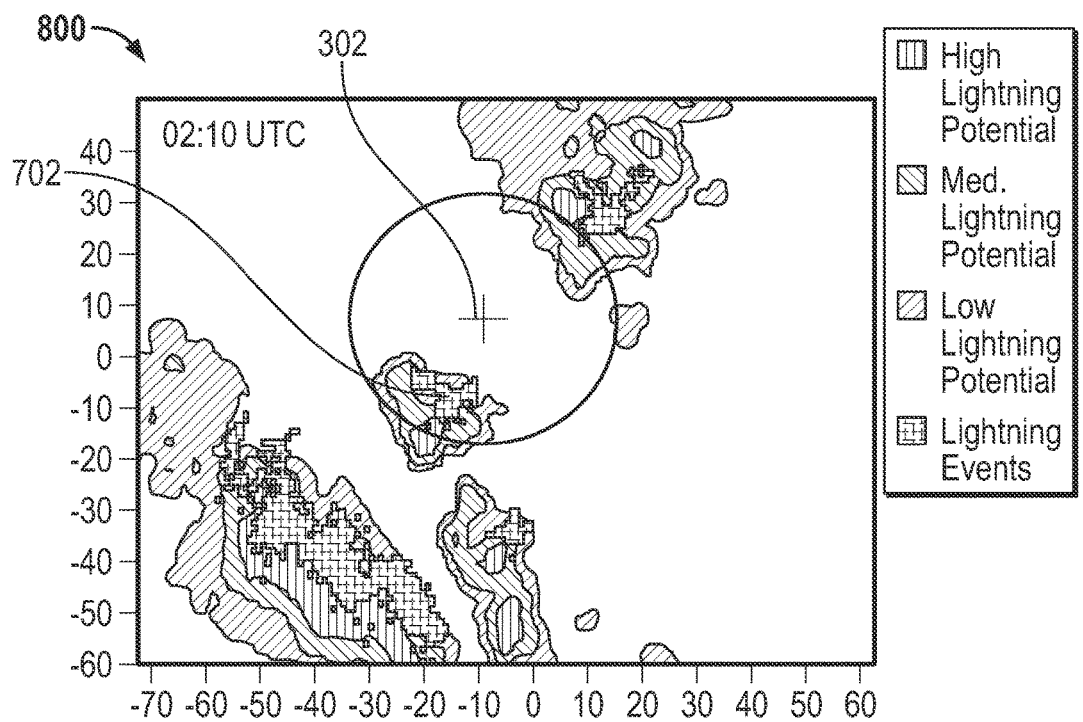
FIG. 8 depicts an example of a storm event 800 according to an embodiment of the Application.

FIGS. 7-8 depict an example of lightning prediction according to an embodiment of the Application. FIGS. 7-8 each depict a range of lightning potential, represented by a first range of shading corresponding to a high lightning potential typically associated with a thunderstorm core, and a second range of shading corresponding to low lightning potential typically associated with either anvil lightning or storm initiation. A third range of shading may correspond to a medium level of lightning potential. For example, grid location 702 indicates a low lightning potential associated with initiation of a new storm and grid location 704 indicates a high lightning potential associated with a thunderstorm core.

Both FIGS. 7-8 are overlaid with a fourth range of shading indicating lightning events detected with regional lightning detection systems. For example, lightning may be detected using Very High Frequency (VHF) based lightning detection systems such as the Lightning Mapping Array (LMA) developed by the New Mexico Institute of Mining and Technology. Such systems detect total lightning activity with very high efficiency. In detecting the three-dimensional positions of VHF sources emitted from lightning, they allow the mapping of entire flash structures.

As it may be seen, FIG. 7 captures an observed storm event 700 and FIG. 8 captures an observed storm event 800 in the vicinity of target location 302. Storm event 700 occurs at a first time, 1:50 UTC, and storm event 800 occurs at a second time, 2:10 UTC. FIGS. 7 and 8 depict both the lightning potential and lightning detected during storm events 700 and 800. In FIG. 7, a low lightning potential is depicted at grid location 702, indicating a risk of initiation lightning. Twenty minutes later, FIG. 8 depicts significantly enhanced lightning potential values and that lightning is detected in grid location 702.

Figure 9:
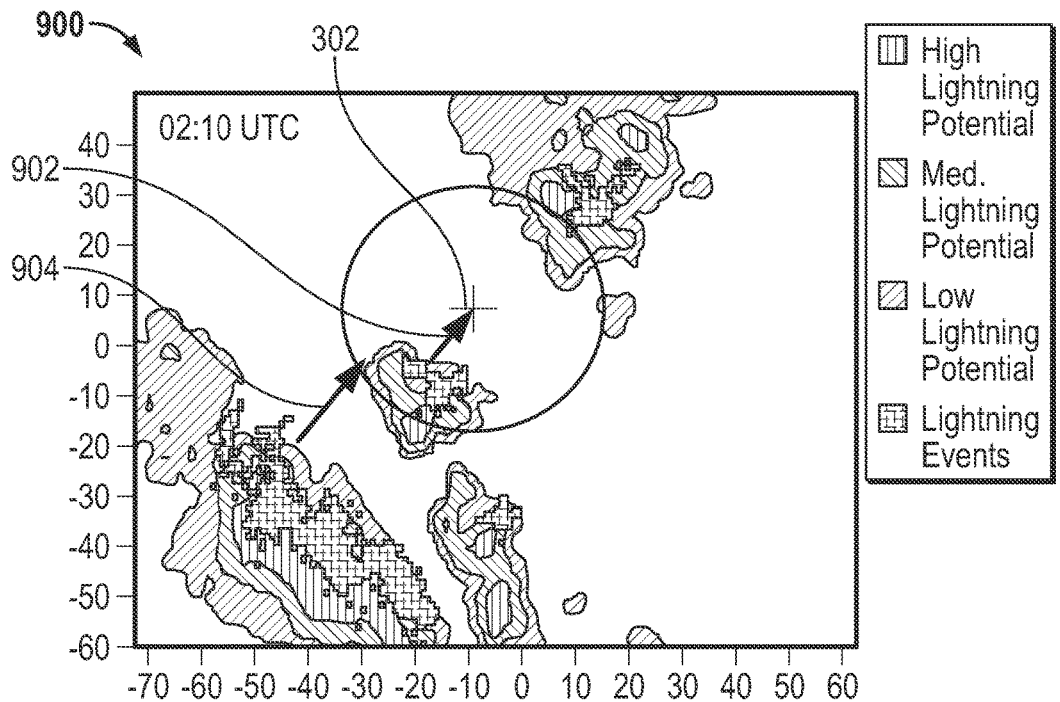
FIG. 9 depicts an example of a storm event 900 according to an embodiment of the Application.
Figure 10:
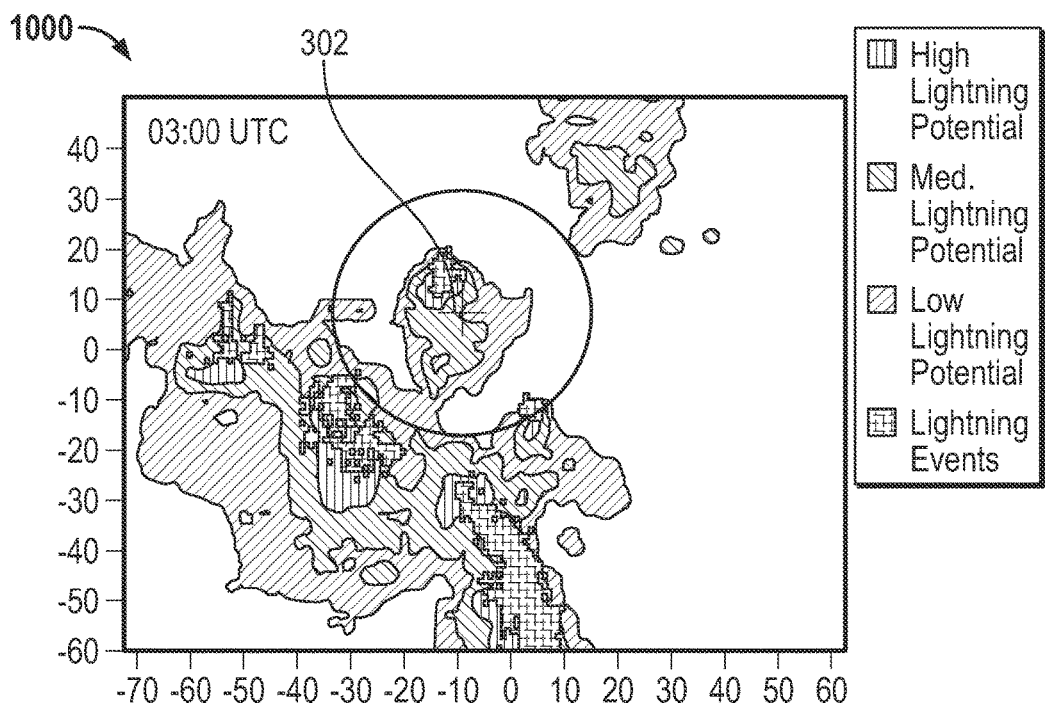
FIG. 10 depicts an example of a storm event 1000 according to an embodiment of the Application.

FIGS. 9-10 depict further observed storm events 900 and 1000. FIG. 9 captures an observed storm event 900 at 2:10 UTC, and FIG. 10 captures an observed storm event 1000 at 3:00 UTC in the vicinity of target location 302. Like FIGS. 7-8, FIGS. 9-10 depict both lightning potential and detected lightning events during the evolution of a storm in the vicinity of a target location 302. FIG. 9 also depicts a future lightning potential as indicated by arrows 902 and 904, however. Arrow 902 indicates that a lightning potential associated with a thunderstorm, including a potential for both core and anvil lightning, will move from the area of the base of arrow 902 at 2:10 UTC to the area around the tip of arrow 902 at 3:00 UTC. Arrow 904 indicates that another region of lightning potential for thunderstorm core and anvil lightning will move from the base of arrow 904 at 2:10 UTC to the area around the tip of arrow 904 at 3:00 UTC. FIG. 10 depicts the lightning potential and lightning detected 50 minutes later, at 3:00 UTC. As may be seen, the predicted advection of lightning potential indicated by arrows 902 and 904 at 2:10 UTC actually comes to pass at 3:00 UTC.

In embodiments, arrows 902 and 904 may be replaced with contours or other appropriate shapes and symbols to indicate a future location of lightning potential.

Figure 4:
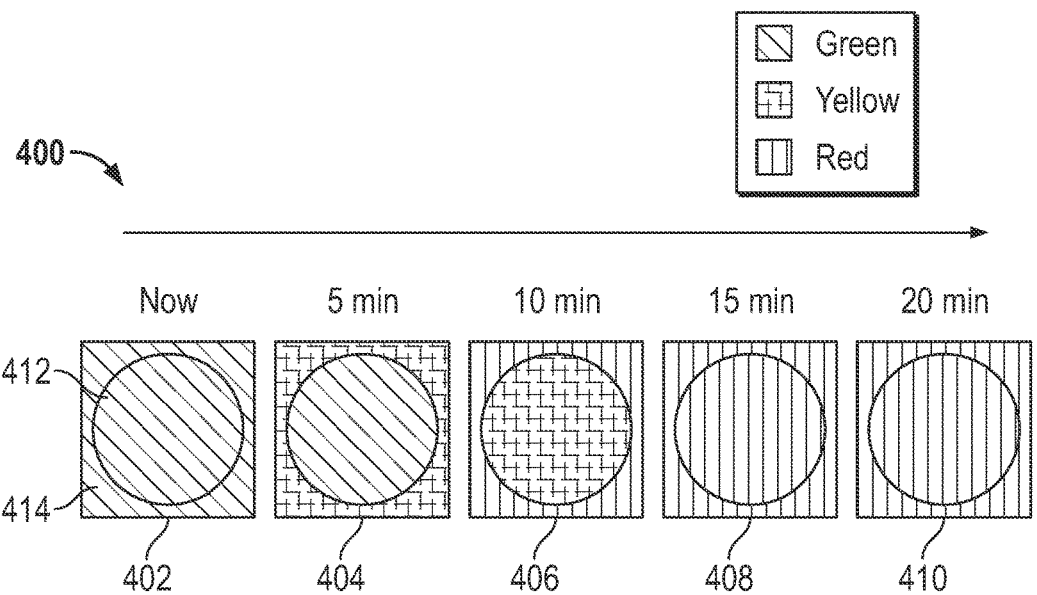
FIG. 4 depicts a lightning alert icon 400 according to an embodiment of the Application.
Figure 5:
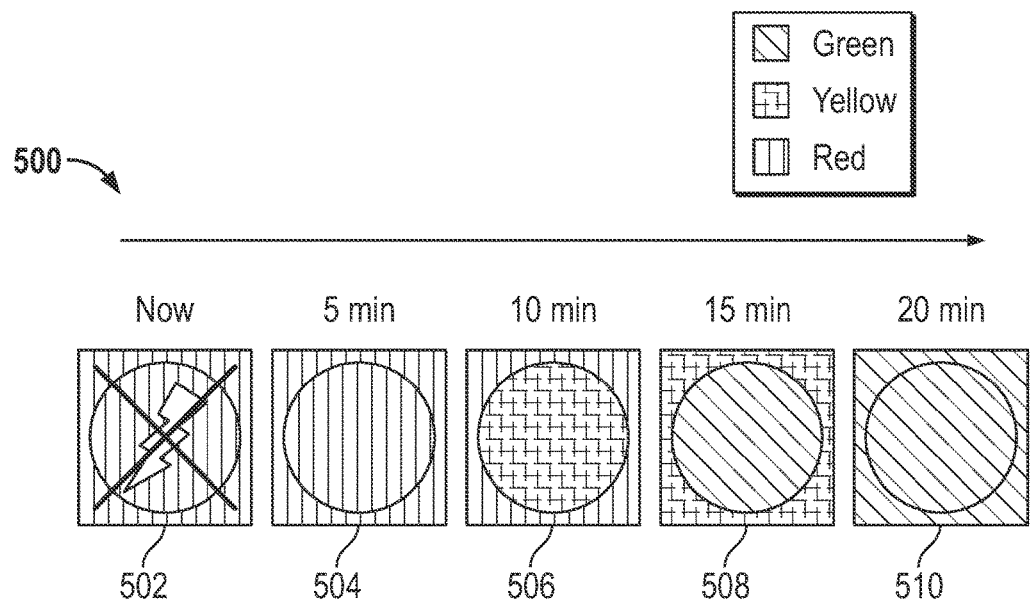
FIG. 5 depicts a lightning alert icon 500 according to an embodiment of the Application.

In further embodiments of method 100, the first lightning potential for the inner outlook region and the second lightning potential for the outer outlook region may be displayed. For example, FIGS. 4 and 5 depict lightning alert icons 400 and 500 according to embodiments of the Application. Lightning alert icons 400 and 500 each depict a series of five icons, 402, 404, 406, 408, and 410, and 502, 504, 506, 508, and 510, respectively. Each series of five icons represents the lightning potential at present and 5, 10, 15, and 20 minutes into the future.

In the examples of lightning alert icons 400 and 500, each icon includes an inner portion and an outer portion peripheral to the inner portion. For example, icon 402 includes inner portion 412 and outer portion 414. In the examples provided in FIGS. 4 and 5, inner portion 412 is a circle and outer portion 414 forms a square border peripheral to inner portion 412. The examples provided are not intended to be limiting, however. In practice, the inner portion 412 and the outer portion 414 of an icon may take any shape or proportion that may be readily understood by a decision maker. In embodiments of the Application, the outer portion 414 may be divided up into segments, similar to the discussion of outer region 310 in FIG. 3.

The inner portion 412 of the icon includes a first color (or shading) that indicates a lightning potential for a target location 302 or an inner outlook region 306. The outer portion 414 of the icon includes a second color that indicates a lightning potential for an outer outlook region 310. The inner and outer portions 412, 414 each include one of three colors to represent a low (which includes zero), medium, or high lightning potential. In embodiments, the low lightning potential may be represented by green, the medium lightning potential may be represented by yellow, and the high lightning potential may be represented by red. In other embodiments, other colors and visual effects may be contemplated to distinguish different levels of lightning potential for a decision maker or operator, however.

Advantageously, it may be seen that lightning alert icons 400 and 500 provide a high-value single-glance system to allow a decision maker to easily understand the lightning potential in and around a target location 302. For example, icons 402 and 502 may provide information about the present lightning potential, observed actual lightning (e.g., the white lightning symbol in 502), and ramp closure status (e.g., black crossbars in 502). Icons 404, 406, 408, 410, 504, 506, 508, and 510 may allow the decision maker in a single glance to view the predicted evolution of conditions in the near term. Each icon further provides information about both the lightning potential at a target position 302 (or inner outlook region 306) in the inner portion 412 and the lightning potential in an outer outlook region 310 in the outer portion 414. As such, lightning alert icons 400 and 500 provide information about how a lightning threat may be changing with respect to a target location 302, both geographically and temporally.

For example, lightning alert icon 400 depicts a scenario in which a storm providing a potential for lightning moves into outer outlook region 310, and then inner outlook region 306. Icon 404 indicates that a lightning potential in the outer outlook region is predicted to become medium in 5 minutes, and icon 406 indicates that outer outlook region is predicted to have a high lightning potential in 10 minutes. Icon 406 indicates that the inner outlook region 306 is predicted to have a medium lightning potential in 10 minutes and icon 408 indicates that the inner outlook region is predicted to have a high lightning potential in 15 minutes. Icon 410 indicates that both the inner and outer outlook regions 306 and 310, respectively, are predicted to remain under a high lightning potential.

Lightning alert icon 500 depicts a further scenario where the lightning potential in an inner outlook region is very high in the present and actual lightning is detected. A decision maker may anticipate when the lightning potential will become low again in a single glance, enabling the decision maker to anticipate when it will be safe to resume normal operations. Icon 506 indicates that the lightning potential at a target location is predicted to drop from high to medium in 10 minutes and icon 508 indicates that the lightning potential at the target location is predicted to become low in 15 minutes. Icon 510 indicates that in 20 minutes low lightning potential is predicted return to both the inner and outer outlook regions.

Icon 502 includes further visual symbols, including both a lightning bolt symbol and a large "X". In embodiments, the additional visual symbols may represent that lightning has been observed in and around a target location 302 or that an airport ramp is closed. In further embodiments, other symbols may be further utilized with lightning alert icons 400 and 500 to represent relevant risks or actions to be taken.

In an embodiment, the first color of the inner portion 412 of the icon may be further selected based on a first fractional coverage of the first lightning potential in the inner outlook region 306 and the second color of the outer region 414 of the icon may be further selected based on a second fractional coverage of the second lightning potential in the outer outlook region 310. Icon colors may be selected based upon the fractional coverage of a critical area that includes lightning potential that is greater than a low lightning potential threshold value. For example, a first fractional coverage of the first lightning potential in the inner outlook region 306 may be the percentage of the inner outlook region that is above a very low threshold lightning potential. A second fractional coverage of the second lightning potential in the outer outlook region 310 may be the percentage of the outer outlook region that is determined to be above a very low threshold lightning potential. The icon colors may be selected to represent the lightning potential as a function of fractional coverage of a critical area and may be tuned for specific safety applications.

Figure 6:
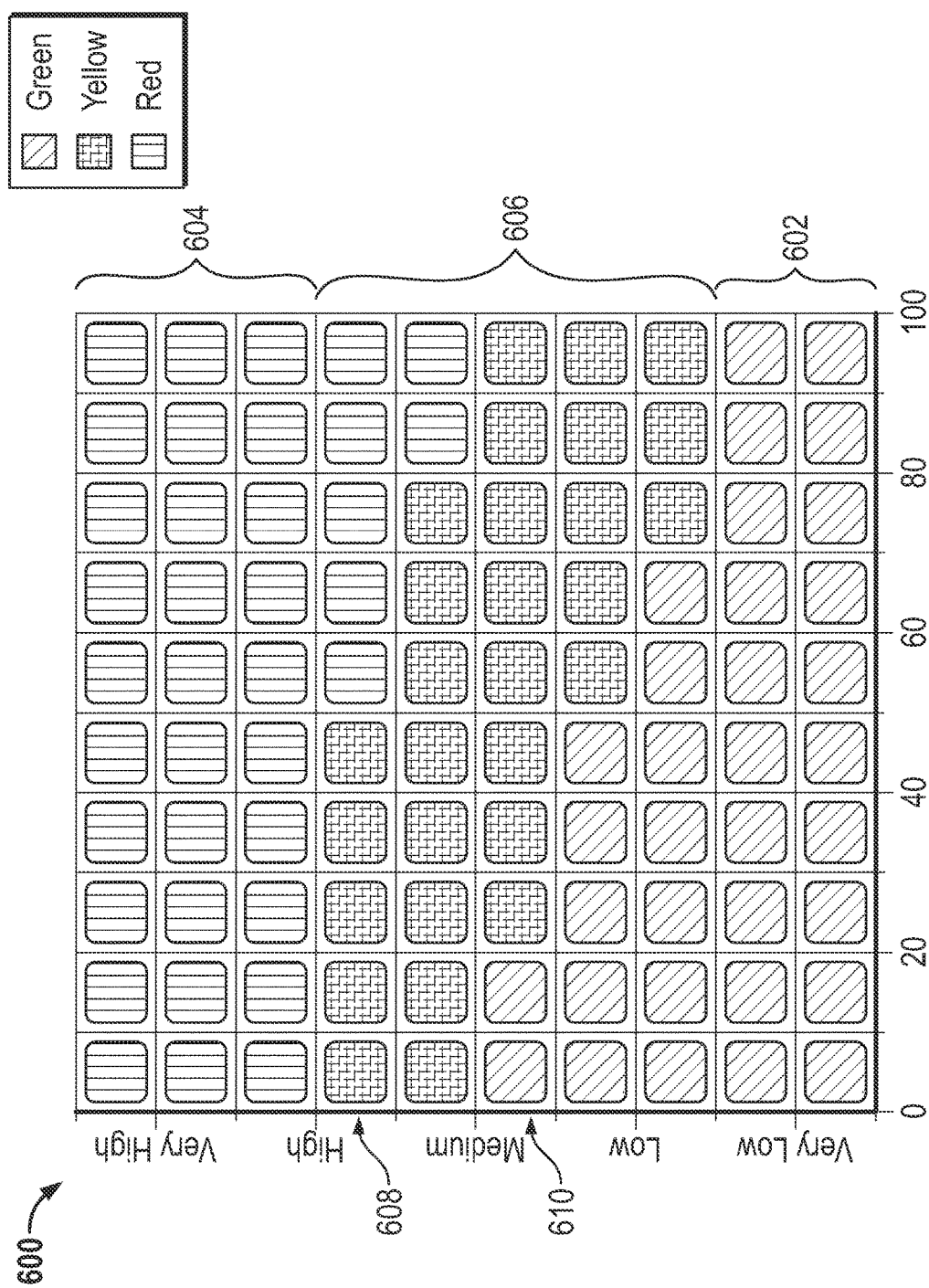
FIG. 6 depicts a ramp closure lookup chart 600 according to an embodiment of the Application.

For example, FIG. 6 depicts an airport ramp closure lookup chart 600 according to an embodiment of the Application. Ramp closure lookup chart 600 may be used to select a first color for an inner portion 412 or a second color for an outer portion 414 of an icon. Ramp closure lookup chart 600 includes a Y-axis that represents a lightning potential threshold and scales from very low to very high. The X-axis represents the fraction of a critical area determined to be over a lightning potential threshold. In embodiments, ramp closure lookup chart 600 may be calibrated to incorporate an operator risk tolerance or an operator response time.

The color buttons found in ramp closure lookup chart 600 indicate the color to be selected for inner or outer portions 412, 414 of the individual icons found in lightning alert icon 400 and 500. For example, the bottom two rows 602 of ramp closure lookup chart 600 represent a very low lightning potential throughout the critical area, and therefore they are all set to green. The top three rows 604 of ramp closure lookup chart 600 indicate that greater than 0% of the critical area includes a very high lightning potential, and therefore all of the buttons in rows 604 are red to indicate a high lightning potential. The middle six rows of ramp closure chart 600 include mixed scenarios. For example, row 610 depicts that when less than 20% of the critical area includes a medium lightning potential, green is selected. However, when greater than 20% of the critical area includes a medium lightning potential in row 610, yellow is selected. In another example, row 608 depicts that when less than 50% of the critical area includes a high lightning potential, yellow is selected. However, when greater than 50% of the critical area includes a high lightning potential in row 608, red is selected.

Advantageously, using fractional area coverage filters such as ramp closure chart 600 may help remove noise and flicker from the display of lightning alert icons 400 and 500, encouraging trust in the decision maker that the lightning prediction system is performing accurately and reliably. Fractional area coverage filters may furthermore help decision makers determine whether the lightning threat is moving towards or away from a target location. For example, it may be better understood via lightning alert icons 400 and 500 that a threat is moving into or tangential to a target location.

Ramp closure lookup chart 600 may be used to select colors for portions of the lightning alert icons 400 or 500 that will be viewed by an operator. For example, an operator may decide to close a ramp if red is used, to place a ramp on alert if yellow is used, or to open a ramp if green is used in lightning alert icons 400 and 500. In further embodiments, ramp closure lookup chart 600 may be customized for any other safety applications, however.

In further embodiments, at least one of the first color or the second color may be selected based on a stakeholder risk tolerance or a response time. Stakeholder risk tolerance balances the potential damage and/or loss of life that may be suffered should a lightning strike event occur versus the costs that may be incurred from initiating safety precautions. Response time is the amount of time that a stakeholder requires to protect personnel and/or equipment. For example, a low stakeholder risk tolerance and a long response time may recommend selecting red more frequently than is represented in ramp closure diagram 600.

In further embodiments, the proximity of a predicted lightning potential to a target location may be factored into the selection of a color for a lightning alert icon 400, 500 using a tunable distance-weighting kernel; for example, based on peak and half-width parameters or other appropriate shape functions.

In embodiments, lightning threats based on predicted lightning potential may be classified as low, moderate, or high in accordance with any combination of the above embodiments in accordance with the needs of an application.

In a further embodiment, additional steps may be included with method 100. For example, at least one of the first lightning potential or the second lightning potential may be calibrated using lightning data. For example, regional or total lightning information such as LMA data may be used to capture and emulate all lightning, including in-cloud and cloud-to-ground lightning threats. Using the LMA data, the calibration of lightning potential may be performed to increase a number of hits (correct detections of lightning) and reduce a number of false alarms (unnecessary alerts).

Figure 2:
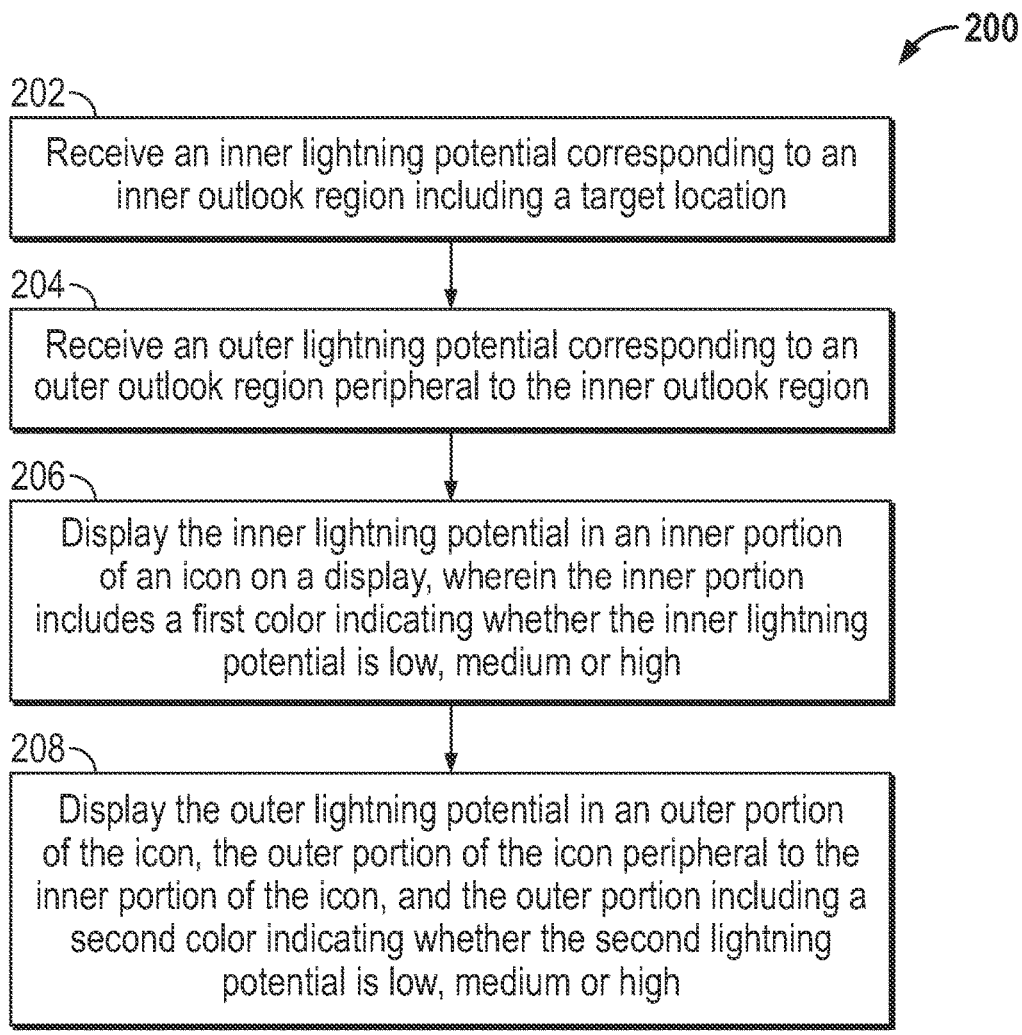
FIG. 2 depicts a method 200 for displaying lightning potential according to an embodiment of the Application.

FIG. 2 depicts a method 200 for displaying lightning according to an embodiment of the Application. Method 200 begins with step 202. In step 202, an inner lightning corresponding to an inner outlook region including a target location is received. For example, a first lightning potential may be received for inner outlook region 306, as described above.

Method 200 continues with step 204. In step 204, an outer lightning potential corresponding to an outer lightning region peripheral to the inner lightning region is received. For example, a second lightning potential for the outer outlook region 310 may be received, as described above.

Method 200 continues with step 206. In step 206, the inner lightning potential is displayed in an inner portion of an icon on a display, wherein the inner portion includes a first color indicating whether the inner lightning potential is low, medium, or high. For example, the icon on a display may be one of icons 402, 404, 406, 408, 410, 502, 504, 506, 508, or 510. The inner portion of the icon may be inner portion 412, as described above.

Method 200 continues with step 208. In step 208, the outer lightning potential is displayed in an outer portion of the icon, the outer portion of the icon being peripheral to the inner portion of the icon, and the outer portion including a second color indicating whether the outer lightning potential is low, medium, or high. For example, the outer portion of the icon may be the outer portion 414 described above.

In embodiments, method 200 may further include the steps of receiving at least one future lightning potential for at least one future time period, the future lightning potential including a future inner lightning potential and a future outer lightning potential, displaying the future inner lightning potential in an additional inner portion of an additional icon on the display, and displaying the future outer lightning potential in an additional outer portion of the additional icon. For example, lightning alert icons 400 and 500 represent a future lightning potential in icons 404, 406, 408, 410, 504, 506, 508, and 510, as described above.

Figure 11:
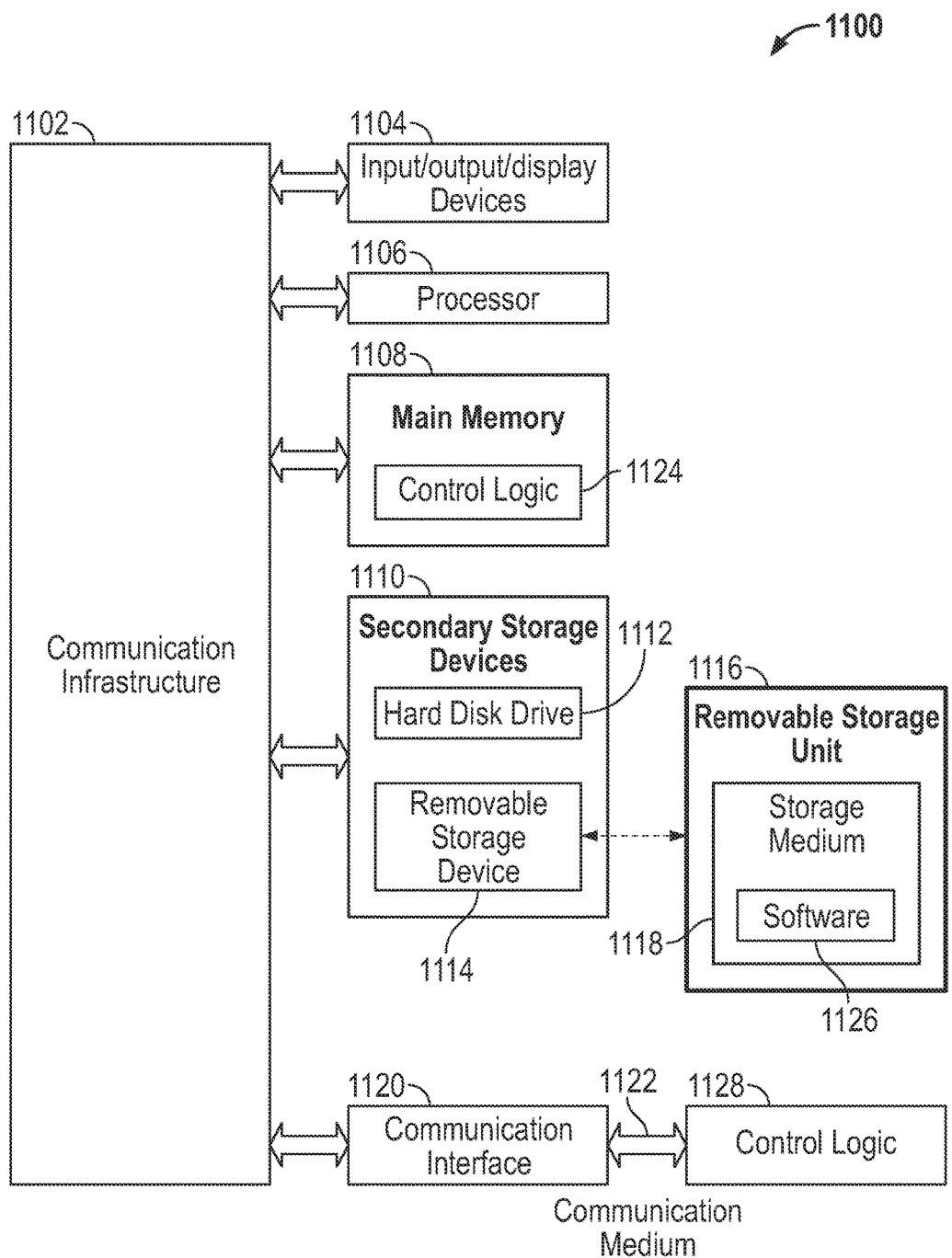
FIG. 11 shows a block diagram of an example computer system in which embodiments of the present Application may be implemented.

FIG. 11 depicts a block diagram of an example computer 1100 in which embodiments of the present Application may be implemented. The embodiments described herein, including systems, methods/processes, and/or apparatuses, may be implemented using well-known servers/computers, such as computer 1100 shown in FIG. 11.

Computer 1100 can be any commercially available and well known computer capable of performing the functions described herein, such as computers available from International Business Machines, Apple, Sun, HP, Dell, Cray, etc. Computer 1100 may be any type of computer, including a desktop computer, a server, or mobile device, etc.

As shown in FIG. 11, computer 1100 includes one or more processors (e.g., central processing units (CPUs)), such as processor 1106. Processor 1106 may perform any of the steps described in the generation of methods 100, 200, generating lightning alert icons 400, 500, or any other calculation, estimation, numerical method, or display described in this Application herein. Processor 1106 is connected to a communication infrastructure 1102, such as a communication bus. In some embodiments, processor 1106 can simultaneously operate multiple computing threads.

Computer 1100 also includes a primary or main memory 1108, such as a random access memory (RAM). Main memory has stored therein control logic 1124 (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such as a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1126 (control logic) and/or data. Removable storage unit 1116 represents a floppy disk, magnetic tape, compact disc (CD), digital versatile disc (DVD), Blue-ray disc, optical storage disk, memory stick, memory card, or any other computer data storage device. Removable storage drive 1114 reads from and/or writes to removable storage unit 1116 in a well-known manner.

Computer 1100 also includes input/output/display devices 1104, such as monitors, keyboards, pointing devices, etc. In embodiments, monitors can be handheld mobile devices (such as phones or tablets) that communicate with computer 1100 via communication infrastructure 1102.

Computer 1100 further includes a communication or network interface 1120. Communication interface 1120 enables computer 1100 to communicate with remote devices. For example, communication interface 1120 allows computer 1100 to communicate over communication networks or mediums 1122 (representing a form of a computer useable or readable medium), such as local area networks (LANs), wide area networks (WANs), the Internet, etc. Network interface 1120 may interface with remote sites or networks via wired or wireless connections. Examples of communication interface 1122 include but are not limited to a modem, a network interface card (e.g., an Ethernet card), a communication port, a Personal Computer Memory Card International Association (PCMCIA) card, etc.

Control logic 1128 may be transmitted to and from computer 1100 via the communication medium 1122.

Any apparatus or manufacture comprising a computer useable or readable medium having control logic (software) stored therein is referred to herein as a computer program product or program storage device. This includes, but is not limited to, computer 1100, main memory 1108, secondary storage devices 1110, and removable storage unit 1116. Such computer program products, having control logic stored therein that, when executed by one or more data processing devices, cause such data processing devices to operate as described herein, represent embodiments of the Application.

The embodiments of the Application described herein provide improvements in predicting lightning through all phases of thunderstorm evolution, including initiation, mature core development, and anvil formation. The embodiments described herein also provide longer lead times to decision makers to protect the health and safety of personnel and critical systems.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the Application.

Thus, although specific embodiments of, and examples for, the Application are described herein for illustrative purposes, various equivalent modifications are possible within the scope of the Application, as those skilled in the relevant art will recognize. The teachings provided herein may be applied to other brace bars, and not just to the embodiments described above and shown in the accompanying figures. Accordingly, the scope of the Application should be determined from the following claims.

We claim:

1. A method for determining lightning potential, the method comprising the steps of:
   receiving radar data and temperature data for a first region;
   using the radar data and the temperature data to determine a vertically integrated ice mass and a product of volume-average radar echo intensity and average cloud depth;
   applying a first membership function to the vertically integrated ice mass to determine a first interest value, wherein the first membership function is predetermined based on observed lightning information;
   applying a second membership function to the product of volume-average radar echo intensity and average cloud depth to determine a second interest value, wherein the second membership function is predetermined based on the observed lightning information;
   determining a first lightning potential value by combining the first interest value and the second interest value;
   generating a pictorial representation of an indication of risk of future lightning occurrences based at least upon the first lightning potential.

2. The method of claim 1, further comprising the steps of:
   using the radar data and the temperature data to determine a cloud depth;
   applying a third membership function to the cloud depth to determine a third interest value, wherein the third membership function is predetermined based on the observed lightning information;
wherein determining the first lightning potential comprises combining the first, second, and third interest values.

3. The method of claim 1, further comprising the steps of:
using the radar data and the temperature data to determine a maximum reflectivity;
applying a fourth membership function to the maximum reflectivity to determine a fourth interest value, wherein the fourth membership function is predetermined based on the observed lightning information;
wherein determining the first lightning potential comprises combining the first, second, and fourth interest values.

4. The method of claim 1, further comprising the steps of:
using the radar data and the temperature data to determine a cloud depth;
using the radar data and the temperature data to determine a maximum reflectivity
applying a third membership function to the cloud depth to determine a third interest value, wherein the third membership function is predetermined based on the observed lightning information;
applying a fourth membership function to the maximum reflectivity to determine a fourth interest value, wherein the fourth membership function is predetermined based on the observed lightning information;
wherein determining the first lightning potential comprises combining the first, second, third, and fourth interest values.

5. The method of claim 1, wherein determining the first lightning potential value further includes the step of:
determining at least a second lightning potential for a second region, wherein the second region is positioned around a periphery of the first region.

6. The method of claim 5, wherein the step of generating the pictorial representation of the indication of risk of future lightning occurrences comprises generating an icon that comprises an inner portion and
an outer portion;
wherein the inner portion of the icon represents the first lightning potential value for the first region, and the outer portion of the icon represents the second lightning potential value for the second region.

7. The method of claim 6, wherein a first color of the inner portion of the icon is based on a first fractional coverage of the first lightning potential value, and a second color of the outer region of the icon is based on a second fractional coverage of the second lightning potential value.

8. The method of claim 7, wherein at least one of the first color and the second color is calibrated based on a predetermined risk tolerance.

9. The method of claim 8, wherein at least one of the first color or the second color is calibrated based on a distance weighting to a predicted lightning potential.

10. The method of claim 7, wherein at least one of the first color or the second color is calibrated based on a predetermined response time.

11. The method of claim 10, wherein at least one of the first color or the second color is calibrated based on a distance weighting to a predicted lightning potential.

12. The method of claim 1, further comprising the steps of:
Providing a predetermined risk tolerance;
Activating an alert if the indication of risk of future lightning occurrences is greater than the predetermined risk tolerance.

13. A system for determining lightning potential, the system comprising:
a weather data module configured to receive radar data and temperature data for a first region, wherein the weather data module is further configured to determine a vertically integrated ice mass and a product of volume-average radar echo intensity and average cloud depth using the radar data and the temperature data;
a predictor field module configured to apply a first membership function to the vertically integrated ice mass to determine a first interest value, wherein the first membership function is predetermined based on observed lightning information, and to apply a second membership function to the product of volume-average radar echo intensity and average cloud depth to determine a second interest value, wherein the second membership function is predetermined based on the observed lightning information;
a lightning potential module configured to determine a first lightning potential by combining the first and second interest values;
a computing module configured to generating a pictorial representation of an indication of risk of future lightning occurrences based at least upon the first lightning potential.

14. The system of claim 13, wherein:
the weather data module is further configured to determine a cloud depth using the radar data and the temperature data;
the predictor field module is further configured to apply a third membership function to the cloud depth to determine a third interest value, wherein the third membership function is predetermined based on the observed lightning information; and
the lightning potential module is further configured to combine the first, second, and third interest values.

15. The system of claim 13, wherein:
the weather data module is further configured to determine a maximum reflectivity using the radar data and the temperature data;
the predictor field module is further configured to apply a fourth membership function to the maximum reflectivity to determine a fourth interest value, wherein the fourth membership function is predetermined based on the observed lightning information; and
the lightning potential module is further configured to combine the first, second, and fourth interest values.

16. The system of claim 13, wherein:
the weather data module is further configured to determine a maximum reflectivity using the radar data and the temperature data;
the weather data module is further configured to determine a cloud depth using the radar data and the temperature data . . . the predictor field module is further configured to apply a fourth membership function to the maximum reflectivity to determine a fourth interest value, wherein the fourth membership function is predetermined based on the observed lightning information; and
the predictor field module is further configured to apply a fourth membership function to the maximum reflectivity to determine a fourth interest value, wherein the fourth membership function is predetermined based on observed lightning information; and the lightning potential module is further configured to combine the first, second, third and fourth interest values.

17. The system of claim 13, wherein the lightning potential module is further configured to determine at least a second lightning potential for a second region, wherein the second region is positioned around a periphery of the first region.

18. The system of claim 17, wherein the computing module is further configured to generate the pictorial representation of the indication of risk of future lightning occurrences based on at least the first lightning potential comprising an icon that comprises an inner portion and an outer portion, wherein the inner portion of the icon represents the lightning potential value for the first region and the outer portion of the icon represents the lightning potential value for the second region.

19. The system of claim 18, wherein a first color of the inner portion of the icon is based on a first fractional coverage of the first lightning potential, and a second color of the outer region of the icon is based on a second fractional coverage of the second lightning potential.

20. The system of claim 19, wherein at least one of the first color or the second color is calibrated based on a predetermined risk tolerance.

21. The system of claim 13, wherein:
the computing module is configured to receive a predetermined risk tolerance; and
an alerting device configured to active if the indication of risk of future lightning occurrences is greater than the predetermined risk tolerance.

\* \* \* \* \*

UNITED STATES PATENT AND TRADEMARK OFFICE
CERTIFICATE OF CORRECTION

PATENT NO. : 10,302,816 B2
APPLICATION NO. : 14/470205
DATED : May 28, 2019
INVENTOR(S) : Wiebke Kristina Deierling, Kyoko Ikeda and Matthias Steiner Page 1 of 1

It is certified that error appears in the above-identified patent and that said Letters Patent is hereby corrected as shown below:

On the Title Page

(73) Assignee: replace "University Corporation for Atmiospheric Research" with --University Corporation for Atmospheric Research--

Signed and Sealed this
Sixteenth Day of July, 2019

Andrei Iancu
*Director of the United States Patent and Trademark Office*